(12) United States Patent
Chen et al.

(10) Patent No.: US 7,527,401 B2
(45) Date of Patent: May 5, 2009

(54) BACKLIGHT MODULE

(75) Inventors: Shin-Li Chen, Linnei Township, Yunlin County (TW); Ching-Kun Lai, Dacun Township, Changhua County (TW)

(73) Assignee: Au Optronics Corp., Hsin-Chu (TW)

( * ) Notice: Subject to any disclaimer, the term of this patent is extended or adjusted under 35 U.S.C. 154(b) by 307 days.

(21) Appl. No.: 11/168,726

(22) Filed: Jun. 28, 2005

(65) Prior Publication Data

US 2006/0146558 A1  Jul. 6, 2006

(30) Foreign Application Priority Data

Dec. 31, 2004  (TW) ............................... 93141902 A

(51) Int. Cl.
*B60Q 1/06* (2006.01)
(52) U.S. Cl. ................ 362/373; 362/555; 362/390; 362/561; 362/339; 362/31
(58) Field of Classification Search .............. 349/64; 362/31, 561, 290, 339, 97, 373
See application file for complete search history.

(56) References Cited

U.S. PATENT DOCUMENTS 6,043,979 A * 3/2000 Shim ...................... 361/695
6,642,974 B2 * 11/2003 Liao ......................... 349/64
6,789,923 B2 * 9/2004 Liao ......................... 362/294
6,880,947 B2 * 4/2005 Hsieh et al. ................ 362/614
7,164,224 B2 * 1/2007 Hayashi et al. ............. 313/27
7,207,709 B2 * 4/2007 Chuang et al. ............. 362/633
2002/0063812 A1 * 5/2002 Natsuyama ................ 349/58
2005/0248520 A1 * 11/2005 Feng et al. ................. 345/87

FOREIGN PATENT DOCUMENTS

| TW | 534969 | 6/2003 |
| TW | 555014 | 9/2003 |
| TW | 589494 | 6/2004 |
| TW | 592322 | 6/2004 |
| TW | I263841 | 10/2006 |

* cited by examiner

*Primary Examiner*—Sandra L O'Shea
*Assistant Examiner*—Jessica L McMillan
(74) *Attorney, Agent, or Firm*—Thomas, Kayden, Horstemeyer & Risley

(57) ABSTRACT

A backlight module is provided. The backlight module includes a frame, a reflector, a plurality of light sources, at least one fan and at least one air vent. The frame has a lateral plate. The reflector is disposed on the inside surface of the frame. The plurality of light sources are disposed on the reflector. The fan is disposed on the outside surface of the lateral plate. The air vent is formed on the frame and the reflector corresponding to the fan.

31 Claims, 11 Drawing Sheets

BACKLIGHT MODULE

This application claims the benefit of Taiwan application Serial No. 93141902, filed Dec. 31, 2004, the subject matter of which is incorporated herein by reference.

BACKGROUND OF THE INVENTION

1. Field of the Invention

The present invention is related in general to a backlight module and, more particularly, to a backlight module with a fan being disposed on a lateral plate of the frame.

2. Description of the Related Art

Along with the rapid advance in the manufacturing technology and the features of slimness, power-saving and low radiation, liquid crystal displays (LCDs) has been widely applied in electronic products such as personal digital assistant (PDA), notebook computer, digital camera, digital video recorder, mobile phone, computer monitor and liquid crystal TV. In a LCD, the LCD panel is non-luminous and needs a backlight module to provide a light source to facilitate display function.

Referring to FIG. 1, a cross-sectional view of a conventional LCD is shown. In FIG. 1, the LCD 9 comprises an LCD panel 8a and a backlight module 8b. The backlight module 8b comprises a frame 2, a reflector 3, a light source comprising a plurality of cold cathode fluorescent lamps (CCFLs) 4, and an optical film comprising a diffuser plate 5, a diffuser piece 7 and a prism 6. The frame 2, whose top surface has an accommodation space 2a disposed thereon, has a bottom-plate's inner surface 2b and two lateral-plate's inner surfaces 2c. The reflector 3 is positioned in the accommodation space 2a to be disposed on the bottom-plate's inner surface 2b and two lateral-plate's inner surface 2c. The plurality of CCFLs 4 are lined up in the accommodation space 2a and positioned above the reflector 3. The diffuser plate 5 is disposed above the plurality of CCFLs 4. The prism 6 is disposed on the diffuser plate 5. The diffuser piece 7 is disposed on the prism 6. The LCD panel 8a is disposed on the diffuser piece 7. Firstly, the light generated by the plurality of CCFLs 4 are projected onto the diffuser plate 5 via the reflection of the reflector 3. Then, the light which has been processed by the diffuser plate 5, the prism 6 and the diffuser piece 7 is projected onto the LCD panel 8a directly.

The CCFL generates high temperature when generating light. A conventional backlight module normally adopts natural convection to ventilate the generated heat. However, as a higher standard of LCD luminance is requested, a larger amount of heat is generated from the light sources. Consequently, the average temperature of the backlight module is increased. The luminance quality of CCFL is deteriorated and mura effect is more likely to occur to the LCD if the CCFL is exposed to a working environment of high temperature. Similarly, the backlight module using a light emitting diode (LED) as the light source also faces the same problem when a higher standard of LCD luminance is requested.

SUMMARY OF THE INVENTION

One embodiments of the present invention to provide a backlight module whose design of disposing a fan on a lateral plate of the frame uses a forced convection to help dissipating the heat of the backlight module, so as to reduce the temperature of the backlight module, maintain a best working environment temperature for the light source and increase the luminance of the backlight module. Besides, the present invention disposes a shock-absorbing material between the fan and the lateral plate, not only reducing the vibration when the fan rotates but also providing anti-hunting protection to the backlight module. According to the present invention, the design of disposing a porous material between the fan and the lateral plate to cover up the air vent prevents dust or foreign matter from falling into the backlight module via the air vent, thus achieving dust-proof effect.

According to another embodiments of the present invention, a backlight module comprising a frame, a reflector, a plurality of light sources, at least one fan and at least one air vent is provided. The frame has a lateral plate. The reflector is disposed on the frame. The plurality of light sources disposed on the reflector. The fan is disposed on the outer surface of the lateral plate. The air vent is formed on the frame and the reflector corresponding to the fan.

According to further embodiments of the present invention, a backlight module comprising a frame, a reflector, a plurality of light sources, a plurality of fans, a first set of air vents, a second set of air vents, a plurality of porous materials, and a plurality of shock-absorbing materials is provided. The frame has a plurality of lateral plates. The reflector is disposed on the frame. The plurality of light sources disposed on the reflector. The first set of air vents are formed on the plurality of lateral plates. The second set of air vents are formed on the reflector. Each of the second set of air vents substantially opposes to each of the first set of air vents. The plurality of porous materials are formed on the outer surface of the plurality of lateral plates and correspondingly cover up the first set of air vents. The plurality of fans are correspondingly disposed on the first set of air vents and the plurality of porous materials. The plurality of shock-absorbing materials are correspondingly disposed between the plurality of fans and the plurality of lateral plates.

The light source can be a cold cathode fluorescent lamp (CCFL) or a light emitting diode (LED). Besides, the porous material comprises an air permeable foam, an air permeable tape, or a filter. Furthermore, the shock-absorbing material comprises a soft-polymer or a rubber.

Other aspect, features, and advantages of the present invention will become apparent from the following detailed description of the preferred but non-limiting embodiments. The following description is made with reference to the accompanying drawings.

DETAILED DESCRIPTION OF THE INVENTION

First Embodiment

Figure 1:
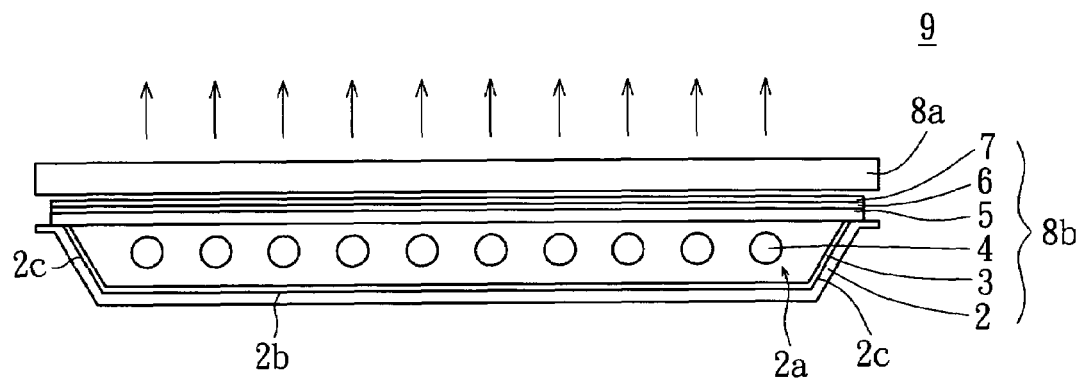
FIG. 1 (Related Art) is a cross-sectional view of a conventional LCD.
Figure 2A:
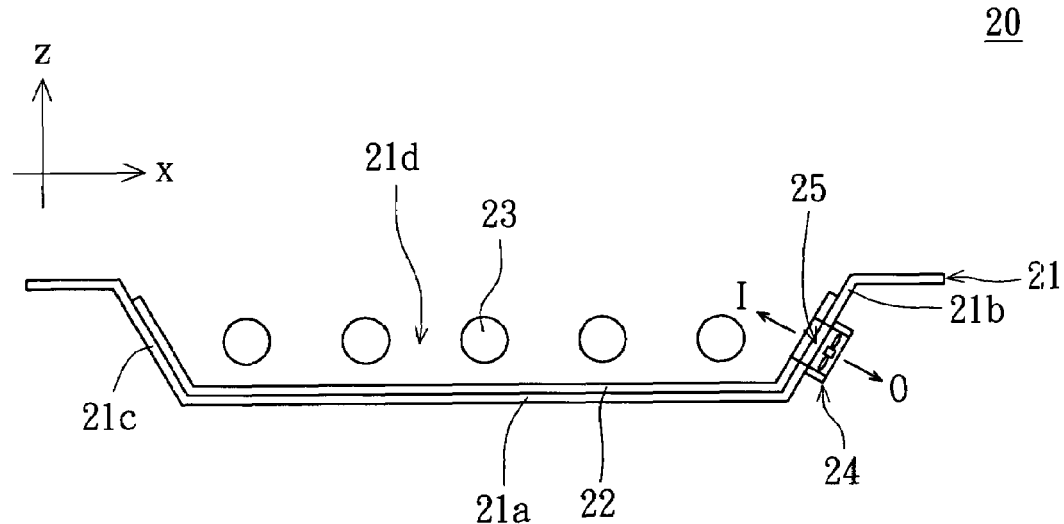
FIG. 2A is a cross-sectional view of a backlight module according to a first embodiment of the present invention.
Figure 2B:
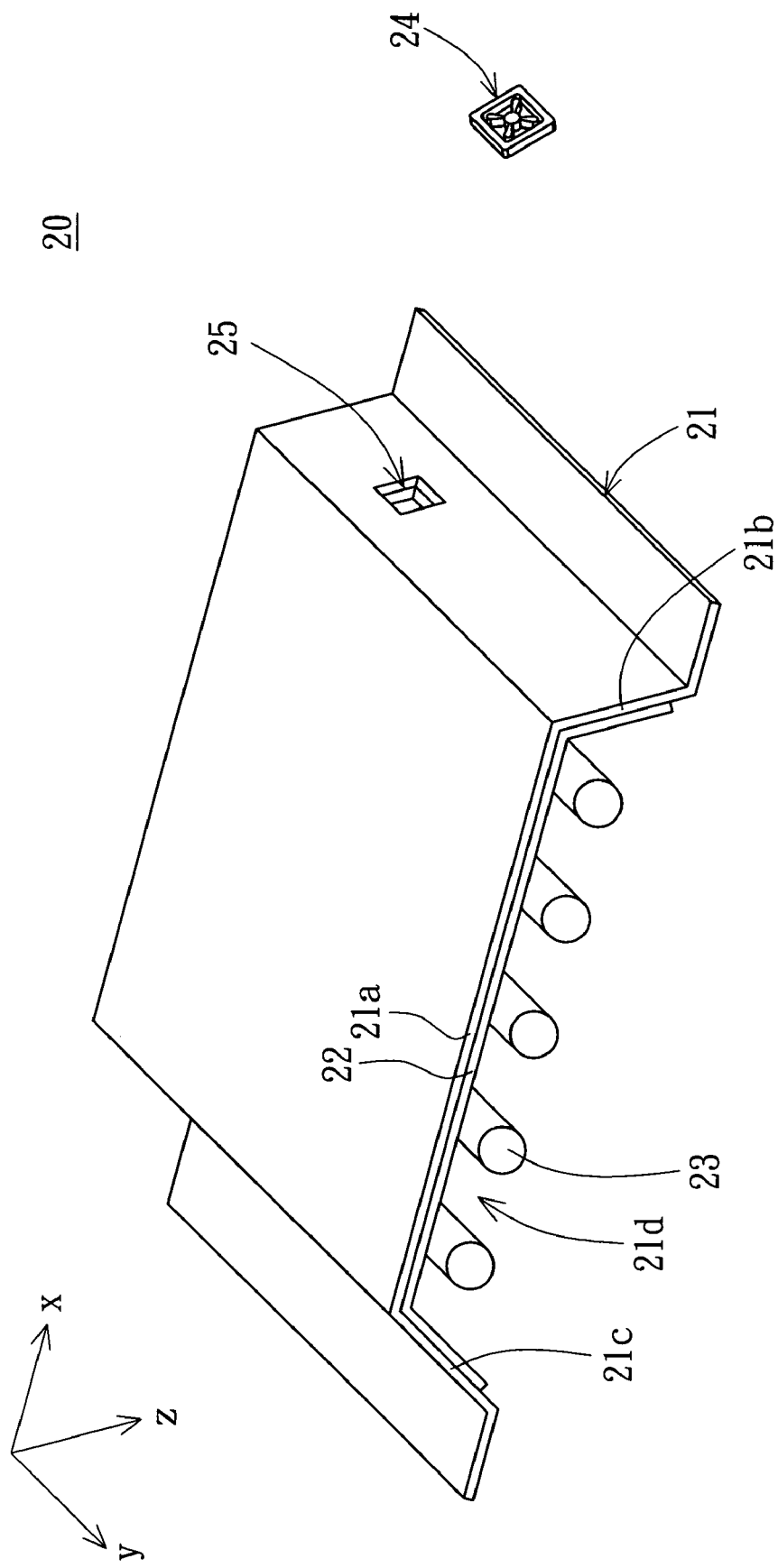
FIG. 2B is a partial exploded stereo-gram view when the backlight module of FIG. 2A is inverted.

Referring to FIGS. 2A~2B, wherein FIG. 2A is a cross-sectional view of a backlight module according to a first embodiment of the present invention, while FIG. 2B is a partial exploded stereo-gram view when the backlight module of FIG. 2A is inverted. In FIGS. 2A~2B, a backlight module 20 comprises a frame 21, a reflector 22, at least one fan 24, at least one air vent 25 and a plurality of light sources. According to the present embodiment of the invention, the plurality of light sources are exemplified by a plurality of cold cathode fluorescent lamps (CCFLs) 23. The frame 21 has a bottom plate 21a and a plurality of lateral plates. According to the present embodiment, the plurality of lateral plates are exemplified by two opposite lateral plates 21b and 21c. Besides, the bottom plate 21a forms an accommodation space 21d with the lateral plates 21b and 21c.

Besides, the reflector 22 is positioned in the accommodation space 21d to be disposed on the frame 21. For example, the reflector 22 is adhered onto or pasted on the inner surface of the bottom plate 21a and the lateral plates 21b and 21c. The reflector 22 comprises a high reflective metal or a high reflective material. The plurality of CCFLs 23 are positioned in the accommodation space 21d to be disposed on the reflector 22 and receives a power via at least one inverter (not shown here) for driving the plurality of CCFLs 23 to generate light.

According to the present embodiment, the fan 24 is disposed on the outer surface of the lateral plate 21b. There are many ways for the fan 24 to be fixed on the outer surface of the lateral plate 21b. For example, the fan 24 can be fixed onto the lateral plate 21b using screw, welding, adherence, bolt, buckle, joint, lock, or other fasteners.

The air vent 25 is formed on the lateral plate 21b and the reflector 22 corresponding to the fan 24. The air vent 25 can be a hole or a plurality of sieve holes. Besides, the air vent 25 are formed on the position of the lateral plate 21b and the reflector 22 corresponding to the fan 24 using laser drilling or mechanical drilling to form a first air vent and a second air vent, respectively.

When the lateral plate 21b and the reflector 22 are jointed together, the first air vent of the lateral plate 21b is linked to the second air vent of the reflector 22 to form the above air vent 25. Besides, the range and the size of the air vent 25 are designed to avoid light leakage of the backlight module 20 and maintain a quality luminance of backlight module 20. Furthermore, the size of the air vent 25 needs to match with the size of the air vent of the fan 24.

According to the present embodiment, when the fan 24 receives a power and rotates, the fan 24 forces air to flow along a direction O and bleed the inside air of the backlight module 20 to ventilate the heat contained inside the backlight module 20. Or, when the fan 24 receives a power and rotates, the fan 24 forces air to flow along a direction I to infuse the outside air of the backlight module 20 into the backlight module 20 to ventilate the heat contained inside the backlight module 20.

Anyone who is skilled in the technology of the present embodiment of the invention will understand that the technology of the embodiment of the invention is not limited thereto. For example, the backlight module 20 is equipped with a control unit and a temperature-sensing unit. The temperature-sensing unit senses the temperature both inside and outside the backlight module 20 whereby the control unit determines along which direction the fan 24 should force the air to flow. If the outside temperature of the backlight module 20 is higher than the inside temperature, the control unit controls the fan 24 to force the air to flow along the direction O to help dissipating the heat of the backlight module 20. If the outside temperature of the backlight module 20 is lower than the inside temperature, the control unit controls the fan 24 to flow along the direction I to help dissipating the heat of the backlight module 20. Besides, the fan 24 can be disposed on the reflector 22 and corresponds to the air vent 25. It is noteworthy that the fan 24 should not affect the LCD panel of the backlight module 20. Or, the fan 24 can be disposed inside the air vent 25, but the light leakage of the backlight module should be avoided.

According to the present embodiment of the invention, the backlight module 20 can dispose at least one convective hole on at least one of the lateral plates 21b and 21c to help dissipating the heat of the backlight module 20. The corresponding position between the convective hole and the air vent 25 is exemplified by accompanied drawings.

Figure 2C:
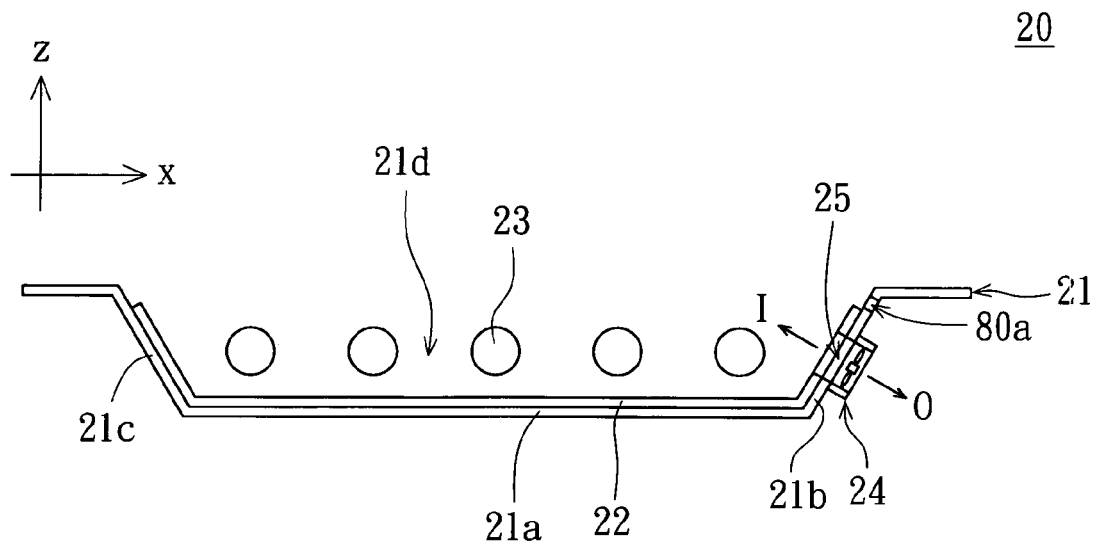
FIG. 2C is a diagram showing the state when the backlight module of FIG. 2A has a first convective hole disposed on a first lateral plate.

As shown in FIG. 2C, the backlight module 20 further comprises a first convective hole 80a disposed on the lateral plate 21b and positioned above the air vent 25.

Figure 2D:
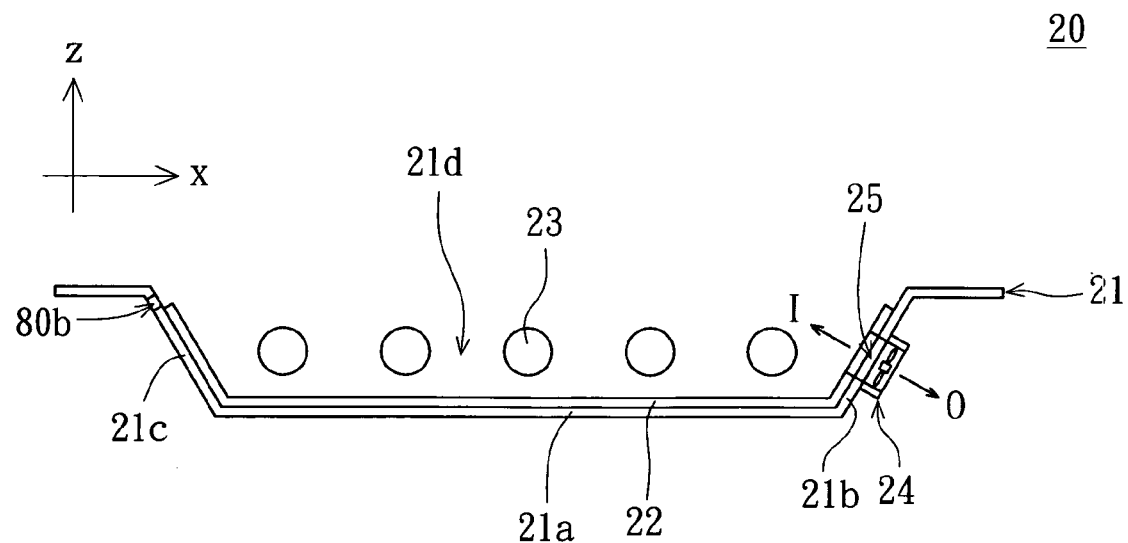
FIG. 2D is a diagram showing the state when the backlight module of FIG. 2A has a second convective hole disposed on a second lateral plate.

As shown in FIG. 2D, the backlight module 20 further comprises a second convective hole 80b formed on the lateral plate 21c. The second convective hole 80b opposes to the air vent 25.

Figure 2E:
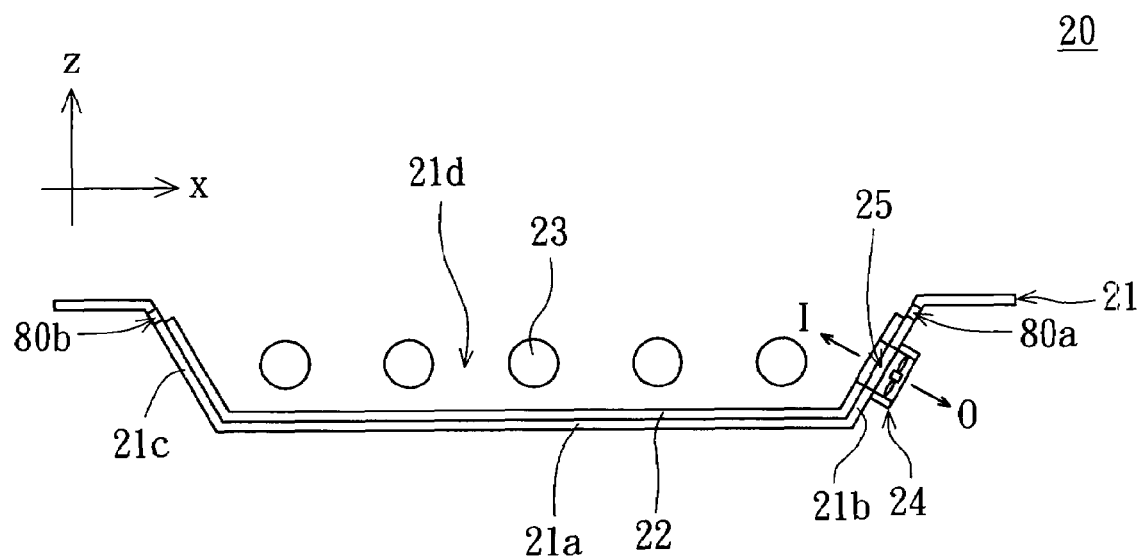
FIG. 2E is a diagram showing the state when the backlight module of FIG. 2A has a first convective hole and a second convective hole respectively disposed on a first lateral plate and a second lateral plate.

As shown in FIG. 2E, the backlight module 20 further comprises a first convective hole 80a and a second convective hole 80b. The first convective hole 80a is formed on the lateral plate 21b and positioned above the air vent 25. The second convective hole 80b is formed on the lateral plate 21c and opposes to the first convective hole 80a and the air vent 25.

Second Embodiment

Figure 3:
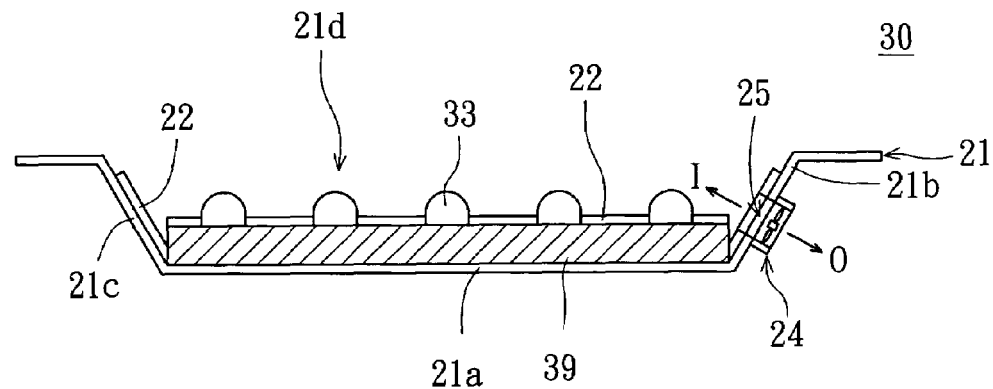
FIG. 3 is a cross-sectional view of a backlight module according to a second embodiment of the present invention.

Referring to FIG. 3, a cross-sectional view of a backlight module according to a second embodiment of the present invention is shown. The backlight module 30 of the present embodiment differs with the backlight module 20 of the first embodiment in that the light sources are a plurality of light emitting diodes (LEDs) 33; as for the similarities, which follow the same numbering are not repeated here. In FIG. 3, the plurality of LEDs 33 are disposed on a circuit board 39 to be electrically coupled to the circuit board 39. The circuit board 39 is positioned in the accommodation space 21d to be disposed on the inner surface of the bottom plate 21a. Besides, the reflector 22 is disposed on the part of the surface of the circuit board 39 not covered up by the plurality of LEDs 33 as well as the part of the inner surface of the lateral plates 21b and 21c not covered up by the plurality of LEDs 33, so that the plurality of LEDs 33 project on the reflector 22. According to the present embodiment of the invention, the backlight module 30 further comprises at least one convective hole formed on at least one of the lateral plates 21b and 21c to help dissipating the heat of the backlight module 30.

Third Embodiment

Figure 4A:
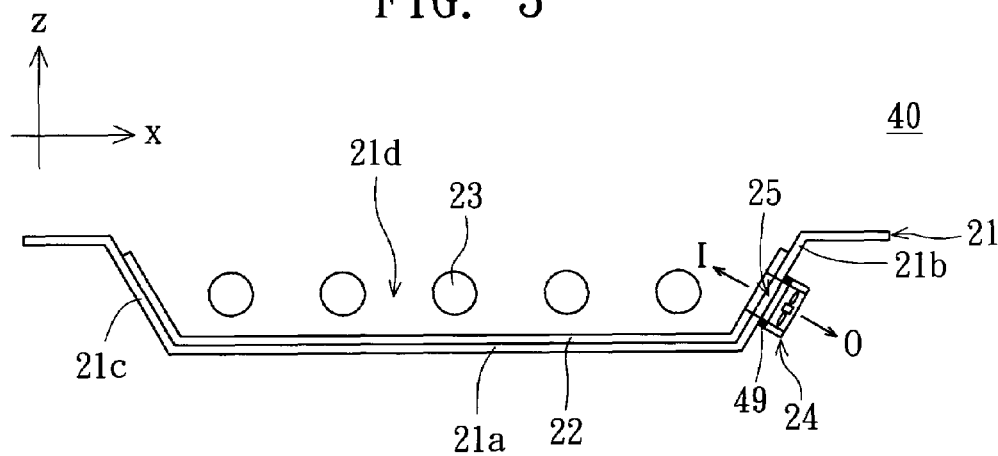
FIG. 4A is a cross-sectional view of a backlight module according to a third embodiment of the present invention.
Figure 4B:
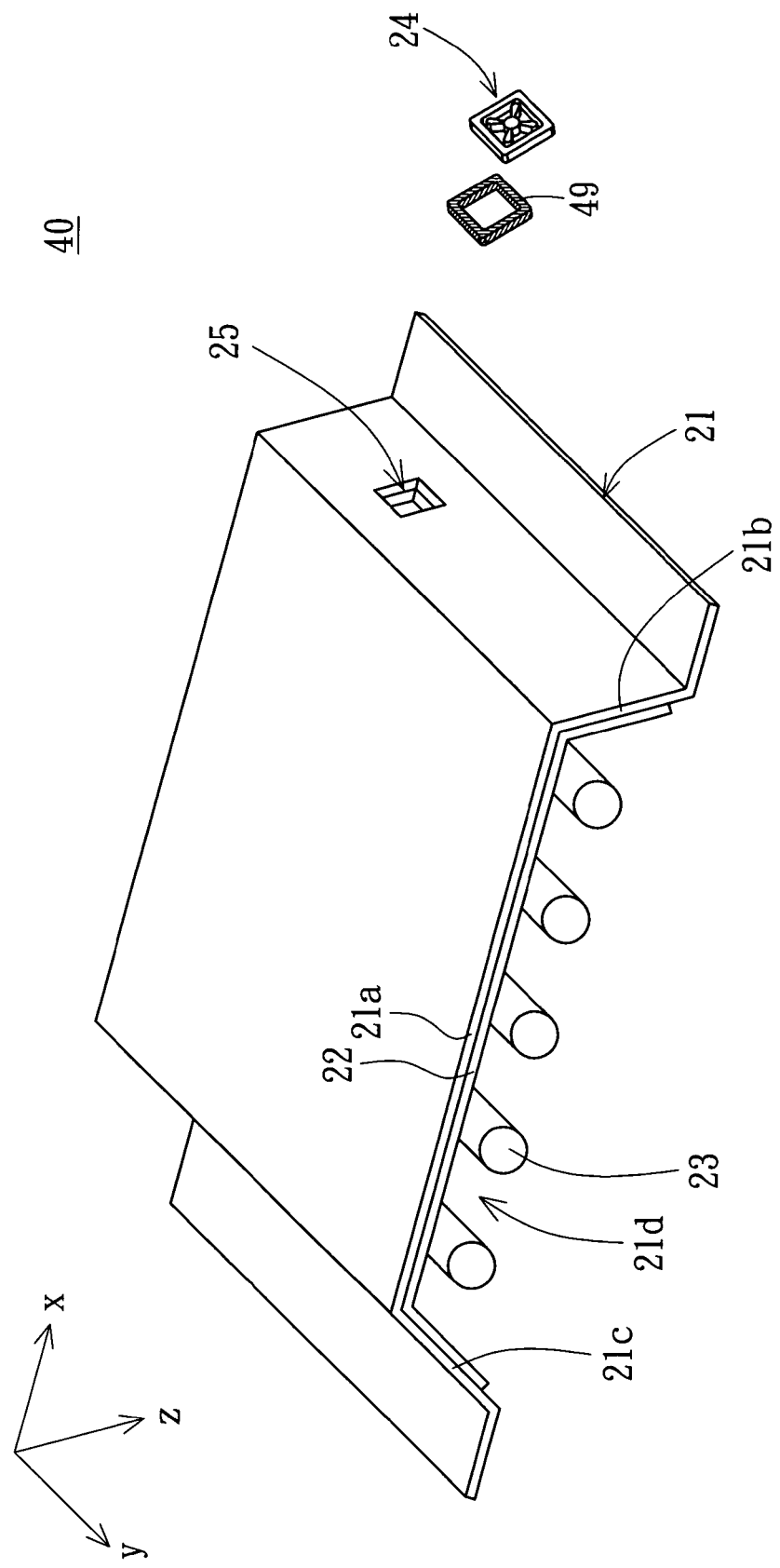
FIG. 4B is a partial exploded stereo-gram view when the backlight module of FIG. 4A is inverted.

Referring to FIGS. 4A~4B, wherein FIG. 4A is a cross-sectional view of a backlight module according to a third embodiment of the present invention, while FIG. 4B is a partial exploded stereo-gram view when the backlight module of FIG. 4A is inverted. The backlight module 40 of the present embodiment of the invention differs with the backlight module 20 of the first embodiment in a shock-absorbing material 49. In FIGS. 4A~4B, the shock-absorbing material 49 is disposed between the fan 24 and the lateral plate 21b to reduce vibration when the fan 24 rotates. Besides, the shock-absorbing material 49 can avoid the air vent 25 or partially cover up the air vent 25. For example, the shock-absorbing material 49 is a ring structure surrounding the air vent 25 on the outer surface of the lateral plate 21b.

Anyone who is skilled in the technology of the present embodiment of the invention will understand that the technology of the present embodiment of the invention is not limited thereto. For example, the shock-absorbing material 49 comprises a soft-polymer or a rubber. Besides, the shock-absorbing material 49 can be disposed between the fan 24 and the lateral plate 21b of FIG. 3. According to the present embodiment of the invention, the backlight module 40 further comprises at least one convective hole formed on at least one of the lateral plates 21b and 21c to help dissipating the heat of the backlight module 40.

Fourth Embodiment

Figure 5A:
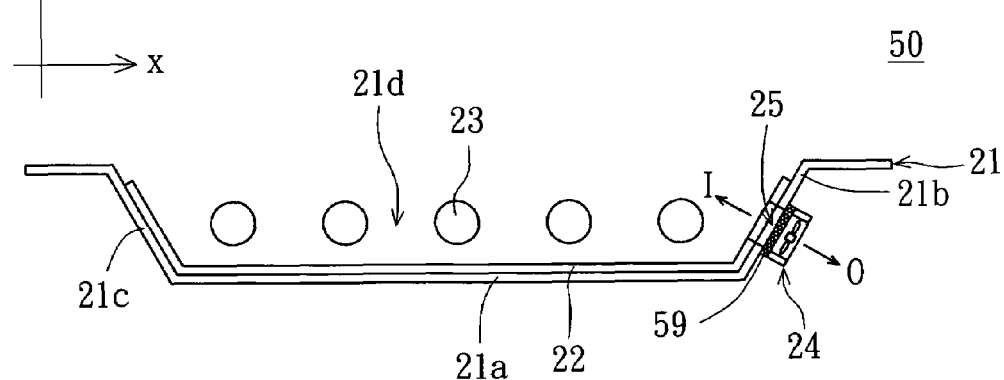
FIG. 5A is a cross-sectional view of a backlight module according to a fourth embodiment of the present invention.
Figure 5B:
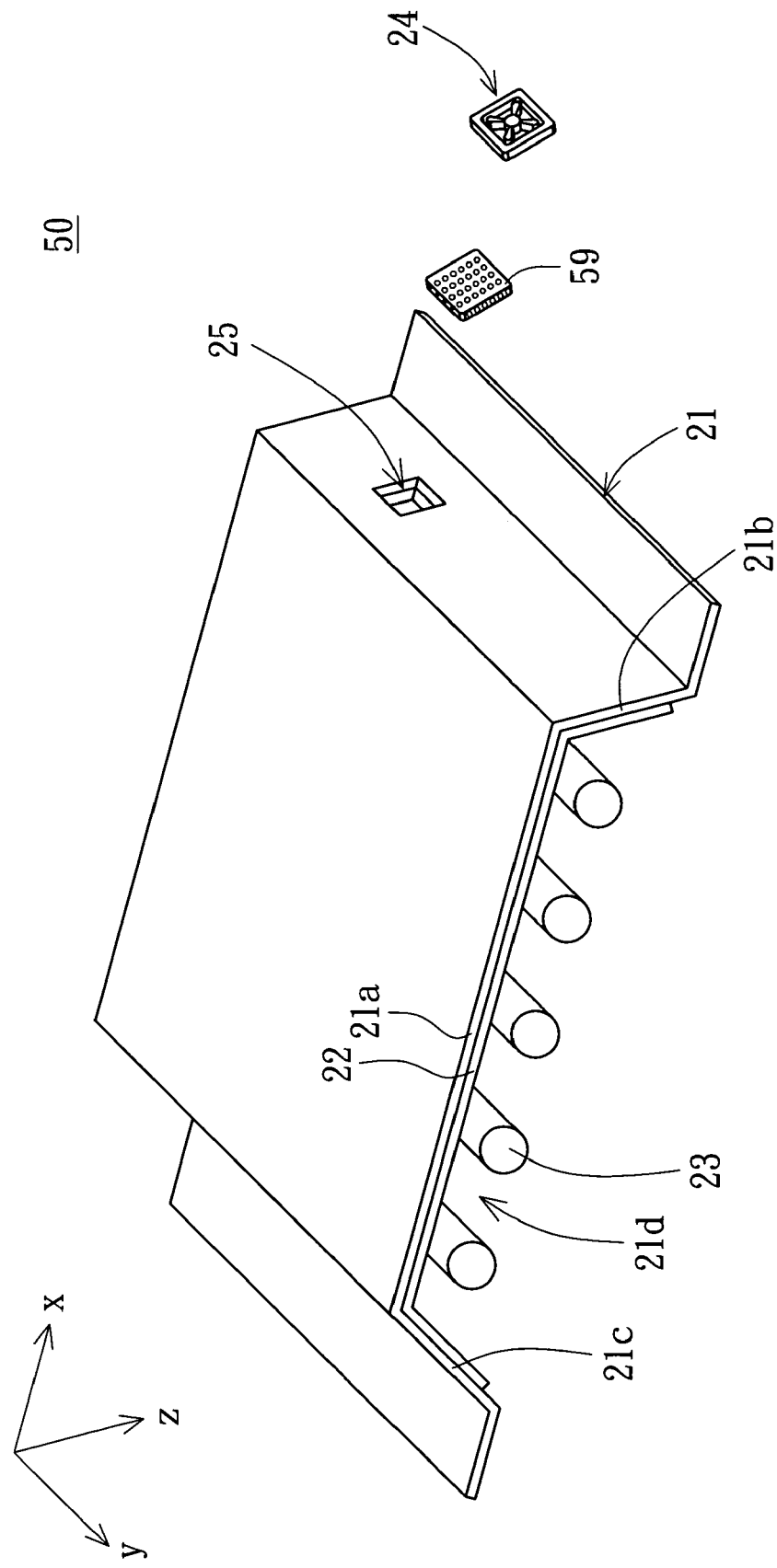
FIG. 5B is a partial exploded stereo-gram view when the backlight module of FIG. 5A is inverted.

Referring to FIGS. 5A~5B, wherein FIG. 5A is a cross-sectional view of a backlight module according to a fourth embodiment of the present invention, while FIG. 5B is a partial exploded stereo-gram view when the backlight module of FIG. 5A is inverted. The backlight module 50 of the present embodiment of the invention differs with the backlight module 20 of the first embodiment of the invention in a porous material 59. In FIGS. 5A~5B, the porous material 59, which is disposed between the fan 24 and the lateral plate 21b, not only allows air to pass through, but also prevents dust from entering the backlight module 50 via the air vent 25 so that the inside of the backlight module 50 is kept clean. Besides, the porous material 59 is disposed on the inner air vent of the fan 24 to totally or partially cover up the air vent 25.

Anyone who is skilled in the technology of the present embodiment of the invention will understand that the technology of the present embodiment of the invention is not limited thereto. For example, the porous material 59 comprises an air permeable foam, an air permeable tape, or a filter. The porous material 59 can be a porous shock-absorbing material comprising a porous soft-polymer or a porous rubber. Besides, the porous material 59 is adhered onto the air vents positioned on the outer surface of the fan 24, so that the fan 24 can be positioned between the porous material 59 and the lateral plate 21b. Furthermore, the porous material 59 can also be disposed on the air vents positioned on two sides of the fan 24. According to the present embodiment of the invention, the backlight module 50 further comprises at least one convective hole formed on at least one of the lateral plates 21b and 21c to help dissipating the heat of the backlight module 50.

The porous material 59 can be disposed between the fan 24 and the lateral plate 21b of FIG. 3. Or, the porous material 59 can be adhered onto the air vent positioned on the outer surface of the fan 24 of FIG. 3, so that the fan 24 of FIG. 3 can be positioned between the porous material 59 and the lateral plate 21b. Or, the porous material 59 can also be disposed on the air vents positioned on two sides of the fan 24 of FIG. 3.

Fifth Embodiment

Figure 6A:
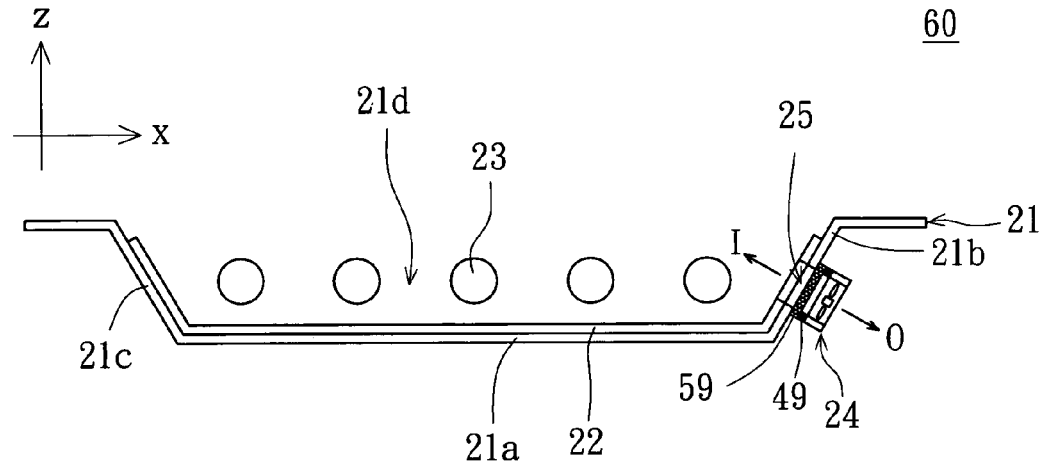
FIG. 6A is a cross-sectional view of a backlight module according to a fifth embodiment of the present invention.
Figure 6B:
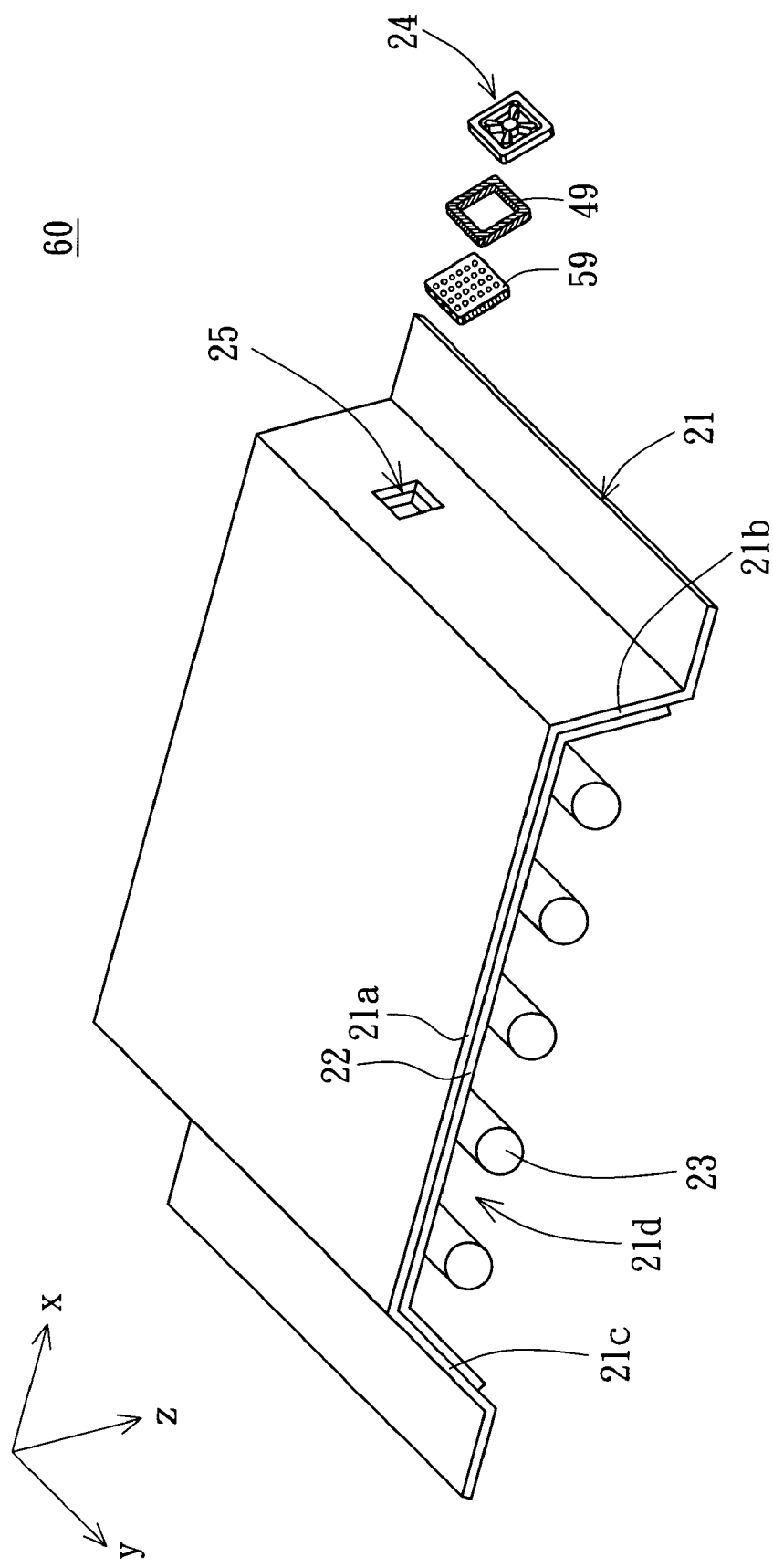
FIG. 6B is a partial exploded stereo-gram view when the backlight module of FIG. 6A is inverted.

Referring to FIGS. 6A~6B, FIG. 6A is a cross-sectional view of a backlight module according to a fifth embodiment of the present invention, while FIG. 6B is a partial exploded stereo-gram view when the backlight module of FIG. 6A is inverted. The backlight module 60 of the present embodiment of the invention differs with the backlight module 40 of the third embodiment of the invention in the porous material 59, and differs with the backlight module 50 of the fourth embodiment in the shock-absorbing material 49. In FIGS. 6A~6B, the shock-absorbing material 49 is disposed between the porous material 59 and the fan 24, that is, the porous material 59 is disposed between the shock-absorbing material 49 and the lateral plate 21b.

Anyone who is skilled in the technology of the present embodiment of the invention will understand that the technology of the present embodiment of the invention is not limited thereto. For example, the porous material 59 can be disposed between the shock-absorbing material 49 and the fan 24, that is, the shock-absorbing material 49 is positioned between the porous material 59 and the lateral plate 21b. Besides, the porous material 59 can be adhered onto the air vents positioned on the outer surface of the fan 24, so that the fan 24 is positioned between the porous material 59 and the shock-absorbing material 49. Moreover, the porous material 59 can also be disposed on the air vents positioned on two sides of the fan 24. According to the present embodiment of the invention, the backlight module 60 further comprises at least one convective hole formed on at least one of the lateral plates 21b and 21c to help dissipating the heat of the backlight module 60.

Besides, the shock-absorbing material 49 and the porous material 59 can be disposed between the fan 24 and the lateral plate 21b of FIG. 3, so that the shock-absorbing material 49 is positioned between the porous material 59 and the lateral plate 21b; or the porous material 59 is positioned between the shock-absorbing material 59 and the lateral plate 21b. Furthermore, the shock-absorbing material 49 can be disposed between the fan 24 and the lateral plate 21b of FIG. 3, while the porous material 59 can be adhered onto the air vents positioned on the outer surface of the fan 24 of FIG. 3, so that the fan 24 of FIG. 3 is positioned between the porous material 59 and the shock-absorbing material 59. The porous material 59 can even be disposed on the air vents positioned on two sides of the fan 24 of FIG. 3.

Sixth Embodiment

Figure 7:
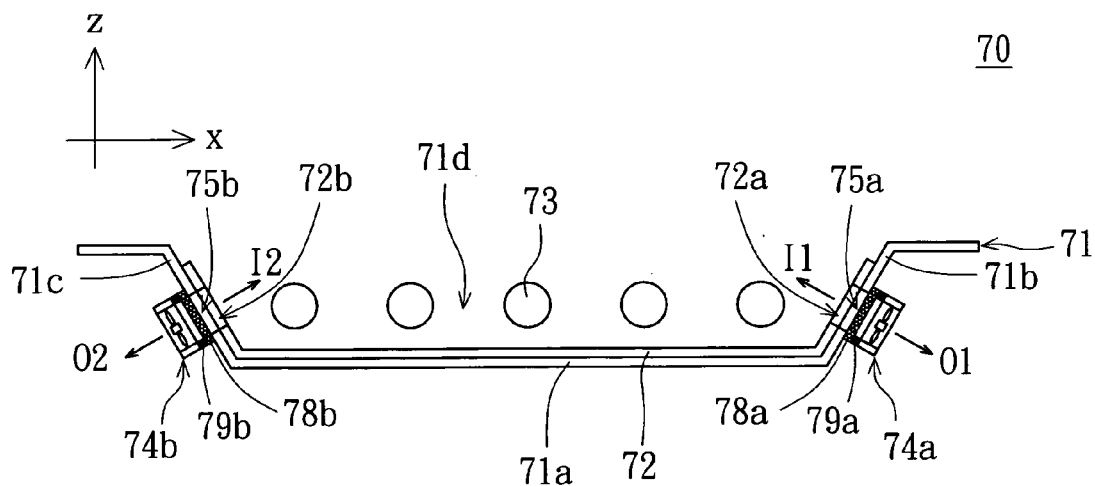
FIG. 7 is a cross-sectional view of a backlight module according to a sixth embodiment of the present invention.

Referring to FIG. 7, a cross-sectional view of a backlight module according to a sixth embodiment of the present invention is shown. In FIG. 7, a backlight module 70 comprises a frame 71, a reflector 72, a plurality of light sources, a first set of air vents, a second set of air vent, a plurality of porous materials, a plurality of shock-absorbing materials and a plurality of fans. The plurality of light source comprises a plurality of CCFLs or a plurality of LEDs. According to the present embodiment of the invention, the plurality of light sources, the first set of air vents, the second set of air vents, the plurality of porous materials, the plurality of shock-absorbing materials and the plurality of fans are respectively exemplified by a plurality of CCFLs 73, two first air vents 75a and 75b, two second air vents 72a and 72b, two porous material 78a and 78b, two shock-absorbing materials 79a and 79b, and two fans 74a and 74b.

The frame 71 has a bottom plate 71a and a plurality of lateral plates. According to the present embodiment of the invention, the plurality of lateral plates are exemplified by two opposite lateral plates 71b and 71c. Besides, the bottom plate 21a and the lateral plate 71b and 71c form an accommodation space 71d.

The reflector 72 is positioned on the accommodation space 71d to be disposed on the frame 71. For example, the reflector 72 is adhered onto or pasted on the inner surfaces of the bottom plate 71a and the lateral plates 71b and 71c. The reflector 72 comprises a high reflective metal or a high reflective material. The plurality of CCFL 73s, which are positioned in the accommodation space 71d to be disposed on the reflector 72, receives a power via an inverter and emits light. The first air vents 75a and 75b are respectively formed on the lateral plates 71b and 71c. The second air vents 72a and 72b are formed on the reflector 72 and substantially oppose to the first air vents 75a and 75b, respectively.

The porous materials 78a and 78b are respectively disposed on the outer surfaces of the lateral plates 71b and 71c and correspondingly cover up the first air vents 75a and 75b. The fan 74a is disposed on the first air vent 75a and the porous material 78a. The fan 74b is disposed on the first air vent 75b and the porous material 78b. The shock-absorbing material 79a is disposed between the fan 74a and the lateral plate 71b. The shock-absorbing material 79b is disposed between the fan 74b and the lateral plate 71c. Therefore, the porous material 78a is disposed between the shock-absorbing material 79a and the lateral plate 71b. The porous material 78b is disposed between the shock-absorbing material 79b and the lateral plate 71c.

When the fan 74a is receives a power and rotates, the fan 74a forces air to flow along a direction O1 or a direction I1 so as to ventilate the heat contained inside the backlight module 70 to help dissipating the heat of the backlight module 70. Besides, when the fan 74b receives a power and rotates, the fan 74b forces air to flow along a direction O2 or a direction I2 so as to ventilate the heat contained inside the backlight module 70 to help dissipating the heat of the backlight module 70.

Anyone who is skilled in the technology of the present embodiment of the invention will understand that the technology of the present embodiment of the invention is not limited thereto. For example, the shock-absorbing material 79a can be disposed between the porous material 78a and the lateral plate 71b. The shock-absorbing material 79b can be disposed between the porous material 78b and the lateral plate 71c. Besides, it is applicable to dispose only one porous shock-absorbing material between the fan 74a and the lateral plate 71b and only one porous shock-absorbing material between the fan 74b and the lateral plate 71c. According to the present embodiment of the invention, the backlight module 70 further comprises at least one convective hole formed on at least one of the lateral plates 71b and 71c to help dissipating the heat of the backlight module 70.

Figure 8:
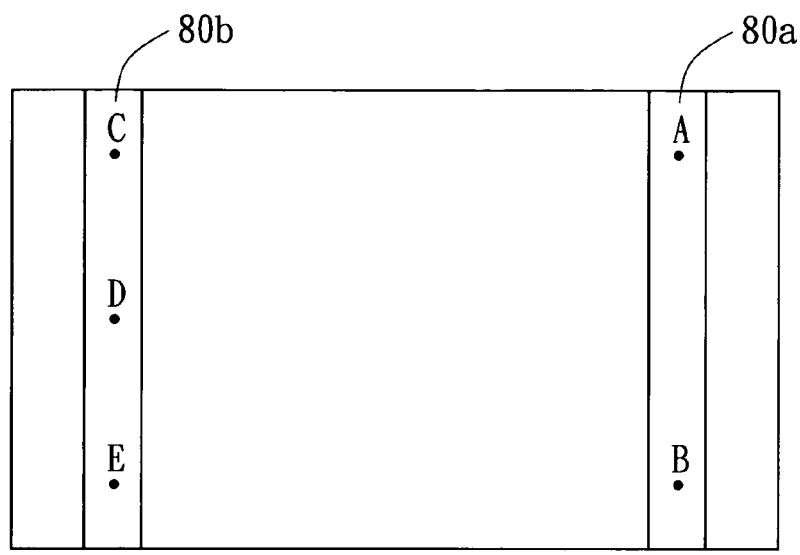
FIG. 8 is an upward view of the frame of a backlight module of the present invention.
Figure 9:
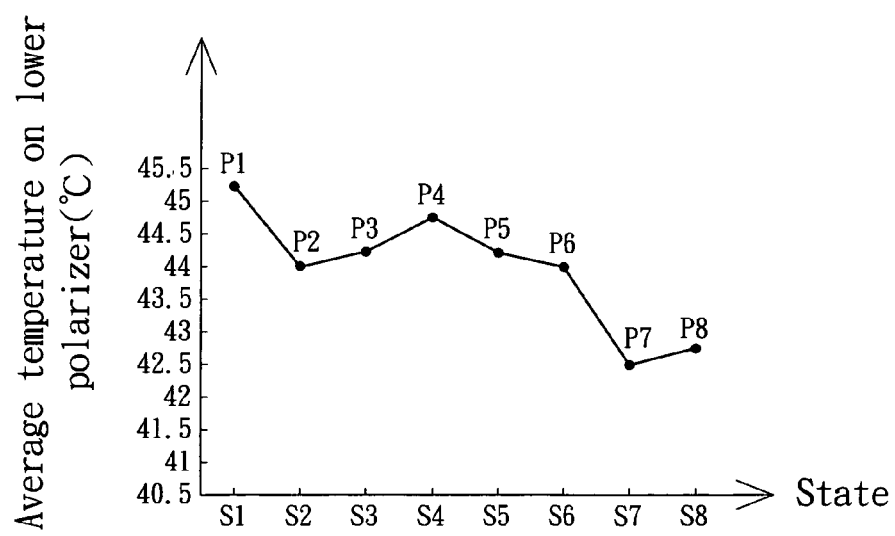
FIG. 9 is a diagram showing the measure of the average temperature on a lower polarizer when the flat display comprising a backlight module of FIG. 8 is at states S1~S8.
Figure 10:
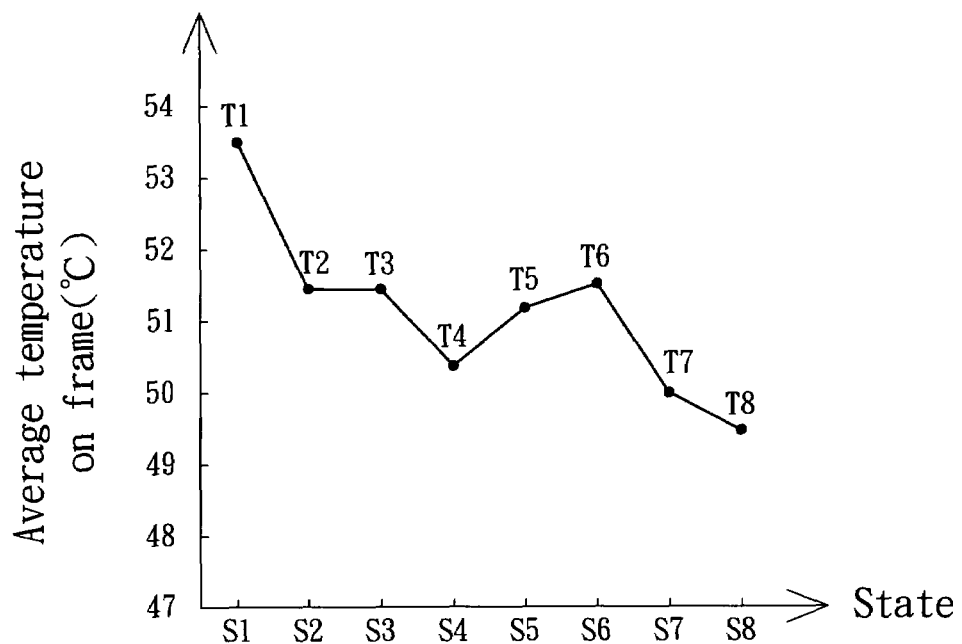
FIG. 10 is a diagram showing the measure of the average temperature on a frame when the flat display comprising a backlight module of FIG. 8 is at states S1~S8.
Figure 11:
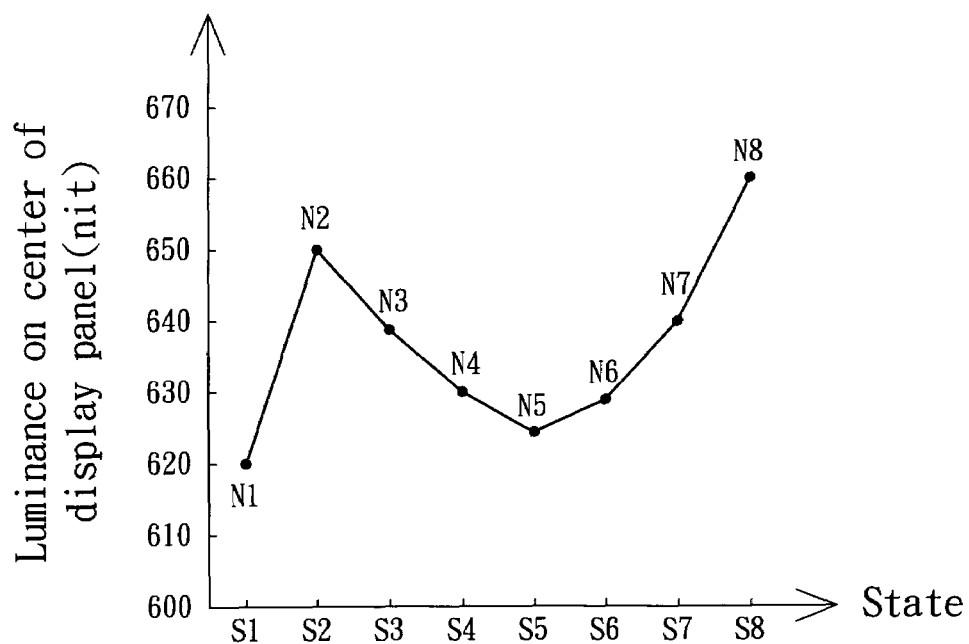
FIG. 11 is a diagram showing the measure of the luminance on the center of a display panel when the flat display comprising a backlight module of FIG. 8 is at states S1~S8.

Referring to FIG. 8, an upward view of the frame of a backlight module of the present invention is shown. In FIG. 8, a frame 80 comprises lateral plates 80a and 80b, positions A~B are the disposition of the fan and the air vent on the lateral plate 80a, and positions C~D are the disposition of the fan and the air vent on the lateral plate 80b. The backlight module comprising the frame 80 forms a LCD with a LCD panel, an upper polarizer and a lower polarizer. The lower polarizer is closer to the accommodation space of a light source on the backlight module than the upper polarizer. Moreover, under the conditions that the room temperature is 25° C. and that the inverter outputs a current of 4.5 mA to the CCFL of the backlight module, the measures of the average temperature on a lower polarizer, the average temperature on a frame and the luminance on the center of a display panel when the flat display comprising a backlight module of FIG. 8 is at states S1~S8 are shown in FIGS. 9~11. State S1 denotes no fan or air vent is disposed at positions A~E. State S2~S6 respectively denote a fan and an air vent are disposed at positions A~E. State S7 denotes a fan is disposed at position A and four air vents are formed at positions A, B, C and E. State S8 denotes a fan and an air vent are disposed at position A, while another fan and another air vent are disposed at position B.

In FIG. 9, state S2~S8 denote lateral plates 80a and 80b are equipped with a fan and an air vent while state S1 denotes no fan or air vent is disposed on the lateral plate 80a and 80b, so the measured average temperatures on the lower polarizer under S2~S8 are lower than that measured under state S1.

In FIG. 10, state S2~S8 dispose a fan and an air vent on the lateral plates 80a and 80b while state S1 does not dispose any fan or air vent on the lateral plates 80a and 80b, so the measured average temperatures on the frame under S2~S8 are lower than that measured under state S1.

In FIG. 11, state S2~S8 dispose a fan and an air vent on the lateral plates 80a and 80b while state S1 does not dispose any fan or air vent on the lateral plates 80a and 80b, so the measured luminance at the center of the panel is higher than that measured under S1.

It can be seen from the average temperature on the lower polarizer, the average temperature on the frame and the measured luminance at the center of the display panel disclosed above that after a fan with forced convection is disposed on the lateral plate, according to the above embodiments of the present invention, the luminance of the LCD panel is largely improved and the average temperature on the frame of the backlight module is largely reduced. In terms of the contribution to improving overall luminance and reducing temperature, disposing a fan and an air vent at position A is a preferable design while two fans dissipate the heat better than one fan does.

The backlight module disclosed in the above embodiments of the present invention has the design of disposing a fan on a lateral plate of the frame uses a forced convection to help dissipating the heat of the backlight module, so as to reduce the temperature of the backlight module, maintain a best working environment temperature for the light source and increase the luminance of the backlight module. Besides, the present invention disposes a shock-absorbing material between the fan and the lateral plate, not only reducing the vibration when the fan rotates but also providing anti-hunting protection to the backlight module. According to the present invention, the design of disposing a porous material between the fan and the lateral plate to cover up the air vent prevents dust or foreign matter from falling into the backlight module via the air vent, thus achieving dust-proof effect.

While the present invention has been described by way of example and in terms of a preferred embodiment, it is to be understood that the present invention is not limited thereto. On the contrary, it is intended to cover various modifications and similar arrangements and procedures, and the scope of the appended claims therefore should be accorded the broadest interpretation so as to encompass all such modifications and similar arrangements and procedures.

We claim:

1. A backlight module, comprising:
   a frame having a lateral plate;
   a reflector disposed on the frame;
   a plurality of light sources disposed on the reflector;
   at least one fan disposed on the outer surface of the lateral plate;
   at least one air vent, formed on the lateral plate and the reflector, and corresponding to the fan;
   a layer comprising a porous material adapted to cover up the air vent disposed between the fan and the lateral plate; and
   a porous shock material disposed at one of the outer surface of the fan and the inner surface of the fan.

2. The backlight module according to claim 1, wherein the porous material comprises an air permeable foam, an air permeable tape, or a filter.

3. The backlight module according to claim 1, further comprising:
   a shock-absorbing material disposed between the fan and the lateral plate.

4. The backlight module according to claim 3, wherein the shock-absorbing material comprises a soft-polymer or a rubber.

5. The backlight module according to claim 3, wherein the shock-absorbing material is disposed between the fan and the layer comprising the porous material.

6. The backlight module according to claim 3, wherein the shock-absorbing material is disposed between the lateral plate and the layer comprising the porous material.

7. The backlight module according to claim 1, wherein the layer comprising the porous material is disposed on one of the outer surface of the fan and the inner surface of the fan.

8. The backlight module according to claim 1, wherein the porous shock material is disposed between the fan and the layer comprising the porous material.

9. The backlight module according to claim 1, wherein the plurality of light sources comprise cold cathode fluorescent lamps (CCFLs).

10. The backlight module according to claim 1, wherein the plurality of light sources comprise light emitting diodes (LEDs).

11. The backlight module according to claim 1, further comprising:
    at least one convective hole formed on the lateral plate.

12. A backlight module, comprising:
    a frame having a plurality of lateral plates;
    a reflector disposed on the frame;
    a plurality of light sources disposed on the reflector;
    a first set of air vents formed on the plurality of lateral plates;
    a second set of air vents formed on the reflector, each of the second set of air vents substantially opposing to each of the first set of air vents;
    a plurality of porous materials, disposed on the outer surface of the plurality of lateral plates, for correspondingly covering up the first set of air vents;
    a plurality of fans correspondingly disposed on the first set of air vents and the plurality of porous materials; and
    a plurality of shock-absorbing materials correspondingly disposed between the plurality of fans and the plurality of lateral plates.

13. The backlight module according to claim 12, wherein the porous material comprises an air permeable foam, an air permeable tape, or a filter.

14. The backlight module according to claim 12, wherein the plurality of shock-absorbing materials comprises a soft-polymer or a rubber.

15. The backlight module according to claim 12, wherein the plurality of light sources comprise cold cathode fluorescent lamps.

16. The backlight module according to claim 12, wherein the plurality of light sources comprise light emitting diodes.

17. The backlight module according to claim 12, wherein the plurality of porous materials are correspondingly disposed between the plurality of shock-absorbing materials and the plurality of lateral plates.

18. The backlight module according to claim 12, further comprising:
    at least one convective hole formed on at least one of the lateral plurality of plates.

19. A backlight module, comprising:
    a frame having a lateral plate;
    a reflector disposed on the frame;
    a plurality of light sources disposed on the reflector;
    at least one fan disposed on the outer surface of the lateral plate;
    at least one air vent, formed on the lateral plate and the reflector, and corresponding to the fan; and
    a layer comprising a porous shock-absorbing material adapted to cover up the air vent.

20. The backlight module according to claim 19, wherein the porous shock-absorbing material is disposed between the fan and the lateral plate.

21. The backlight module according to claim 19, wherein the porous shock-absorbing material comprises a porous soft-polymer or a porous rubber.

22. The backlight module according to claim 19, wherein the layer comprising the porous shock-absorbing material is disposed at one of the outer surface of the fan and the inner surface of the fan.

23. The backlight module according to claim 19, further comprising a porous material adapted to cover up the air vent.

24. The backlight module according to claim 23, wherein the porous material is disposed at one of the outer surface of the fan and the inner surface of the fan.

25. The backlight module according to claim 23, wherein the porous shock-absorbing material is disposed between the fan and the porous material.

26. The backlight module according to claim 19, further comprising at least one convective hole formed on the lateral plate.

27. A backlight module, comprising:
    a frame having a lateral plate;
    a reflector disposed on the frame;
    a plurality of light sources disposed on the reflector;
    at least one fan disposed on the outer surface of the lateral plate;
    at least one air vent, formed on the lateral plate and the reflector, and corresponding to the fan;

a layer comprising a porous material adapted to cover up the air vent disposed between the fan and the lateral plate; and a shock-absorbing material disposed one of between the fan and the layer comprising the porous material and between the lateral plate and the layer comprising the porous material.

28. The backlight module according to claim 27, wherein the shock-absorbing material is disposed at the inner surface of the fan.

29. The backlight module according to claim 27, wherein the shock-absorbing material is disposed on the outer surface of the lateral plate.

30. The backlight module according to claim 27, wherein the porous material comprises an air permeable foam, an air permeable tape, or a filter.

31. The backlight module according to claim 27, wherein the shock-absorbing material comprises a soft-polymer or a rubber.

* * * * *